(12) United States Patent
Thomas et al.

(10) Patent No.: US 8,509,998 B2
(45) Date of Patent: Aug. 13, 2013

(54) METHOD AND DEVICE FOR THE REMOTE COLLECTION OF DATA FROM AIRCRAFT OR SHIP RECORDERS

(75) Inventors: Hubert Thomas, Le Tholonet (FR); Yann Le Page, Marseilles (FR)

(73) Assignee: Architecture Et Conception de Systemes Avances, Meyreuil (FR)

( * ) Notice: Subject to any disclaimer, the term of this patent is extended or adjusted under 35 U.S.C. 154(b) by 0 days.

(21) Appl. No.: 13/509,326

(22) PCT Filed: Nov. 12, 2010

(86) PCT No.: PCT/FR2010/052418
§ 371 (c)(1),
(2), (4) Date: Aug. 21, 2012

(87) PCT Pub. No.: WO2011/058281
PCT Pub. Date: May 19, 2011

(65) Prior Publication Data
US 2012/0310487 A1 Dec. 6, 2012

(30) Foreign Application Priority Data
Nov. 13, 2009 (FR) ...................................... 09 05456

(51) Int. Cl.
*G05D 3/00* (2006.01)
(52) U.S. Cl.
USPC ............................................................ 701/49
(58) Field of Classification Search
USPC ............... 701/3, 39, 41, 42, 43, 49, 89, 31.1, 701/31.3, 300; 180/65.21, 197, 311, 411, 180/417; 83/348, 698.41; 493/83, 342, 365; 340/309.4, 691.3; 417/210, 220; 403/321
See application file for complete search history.

(56) References Cited

U.S. PATENT DOCUMENTS

| | | | |
|---|---|---|---|
| 4,070,671 A * | 1/1978 | Morrow | 367/6 |
| 4,981,453 A | 1/1991 | Krishan et al. | |
| 5,086,998 A | 2/1992 | Pelas | |
| 5,218,366 A * | 6/1993 | Cardamone et al. | 342/385 |
| 5,348,502 A * | 9/1994 | Wigram | 441/7 |

(Continued)

FOREIGN PATENT DOCUMENTS

| | | |
|---|---|---|
| DE | 198 48 801 A1 | 4/2000 |
| FR | 2 873 451 A1 | 1/2006 |
| JP | 2003 137194 A | 5/2003 |
| JP | 2005 186682 A | 7/2005 |

OTHER PUBLICATIONS

David Learmount: "Emergency datastreaming system may end need to recover crash recorders", Flightglobal.com, Aug. 12, 2009, pp. 1-2 XP002592762, Extraot de ;'internet: URL:http://www.flightglobal.com/artices/2009/08/12/330919/emergency-datastreaming-system-may-end-need -to-recover-crash.html {extrait le Jul. 24, 2010} p. 1.

*Primary Examiner* — McDieunel Marc
(74) *Attorney, Agent, or Firm* — Dowell & Dowell, P.C.

(57) ABSTRACT

A method and device for the remote collection of data from aircraft or ship recorders, using a buoy (3) which may be ejected in the event of sinking and contains a double memory which stores the positions of the buoy during the drift thereof as well as information relating to the flight or crossing. A two-way radio communication means allows the buoy to transfer the contents of said memories to a remote collection means, which is a reconnaissance aeroplane.

9 Claims, 3 Drawing Sheets

(56) References Cited

U.S. PATENT DOCUMENTS

| | | | |
|---|---|---|---|
| 5,691,957 A * | 11/1997 | Spiesberger | 367/3 |
| 7,208,685 B2 | 4/2007 | Browning et al. | |
| 8,376,790 B2 * | 2/2013 | Hine et al. | 440/9 |
| 2002/0144834 A1 | 10/2002 | Purdom | |
| 2008/0174484 A1 | 7/2008 | Katz | |
| 2008/0278314 A1 * | 11/2008 | Miller et al. | 340/539.13 |

* cited by examiner

METHOD AND DEVICE FOR THE REMOTE COLLECTION OF DATA FROM AIRCRAFT OR SHIP RECORDERS

The present invention relates to a method and to a device for remotely collecting data from aircraft or ship recorders. The field of the invention is therefore that of air or ship transport security.

More particularly, the invention relates to a buoy which is ejectable from an aircraft or a ship when the latter is in a distress situation.

During an aircraft accident at sea, the priority is to recover the recorders of the flight parameters and the recordings of voice communications in the cockpit, most commonly called black boxes or Voyage Data Recorder, abbreviated as VDR, for merchant vessels. In the vent of an accident in deep waters, it is extremely difficult to localize the recorders, because of the limited range of the acoustic transmitters used for their relocalization. Consequently, expensive means are sent over the search area and scan large extensive areas for seeking clues. The duration of these operations may attain several months, making them very expensive.

The object of the invention is therefore the remote collection of data from recorders of aircraft, ships or submarines, either manned or not.

According to an interesting application, the object of the invention is to give the possibility to a reconnaissance aeroplane, during a single flight, of retrieving data from recorders as well as the specific coordinates of the air crash or shipwreck point while conducting in parallel and without any interruption a visual search for floating drifting debris.

There exist different systems intended for allowing retrieval of data from flight recorders. Patent application US 2002/0144834 and U.S. Pat. No. 7,208,685 describe hardened systems ensuring protection of the recordings. They contain a removable memory and a communications interface. Accessing said removable memory with the rescue means, requires an underwater intervention in order to detach it from its support. For this purpose, these systems include an acoustic beacon in order to guide the rescue means towards the recorder. Underwater intervention requires conveying bulky means to an area, which is long and costly.

There also exist data recorders which may be jettisoned by the aircraft itself when it is in a distress situation.

At sea, collecting data requires recovering the recorder at the surface of the sea, either by a ship sent on the area, or by a helicopter for example by using a device such as the one described in U.S. Pat. No. 5,086,998. This operation can only be performed by an aircraft with fixed wings such as a reconnaissance aeroplane which alone has the range allowing it to attain any area of the ocean.

U.S. Pat. No. 4,981,453 describes a transmission buoy for alerting and guiding the rescue means. It does not comprise any device for storing data in memory and consequently does not give the possibility of remotely collecting recorder data.

The main object of the present invention is therefore to solve the problems which the methods and devices of the prior art have, by suggesting a method and device for remotely collecting aircraft or ship recorder data.

In order to achieve the aforementioned goal, the invention proposes a device for remotely collecting aircraft or ship recorder data, characterized in that it comprises an ejectable buoy provided with a bidirectional radio channel with which digital data exchanges may be ensured with a remote means for collecting the data, this buoy being provided with a satellite localization receiver and a local memory in which are stored its successive positions during its drifting at the surface of the sea, said buoy further comprising a memory in which are stored, prior to its ejection, the information as stored in the flight recorders for aircraft, or in the voyage data recorders for ships, said buoy also comprising a power source and a device for actuating its onboard electronics.

The method for remotely collecting aircraft or ship recorder data according to the invention is remarkable in that it comprises the following steps:
inserting an ejectable buoy provided with a satellite localization receiver and a memory, into an automatic ejection device installed onboard the aircraft or the ship for which it is desired to remotely collect the recordings,
recording in the memory of the buoy, throughout the flight or the voyage, characteristic pieces of information, the values of which will desirably be known subsequently,
automatic ejection of the buoy in the vent of an air crash or shipwreck and activation of the electronics internal to the buoy,
recording in the memory of the buoy the successive positions as delivered by its satellite localization receiver,
establishing a bidirectional communication with a remote data collecting means in order to transfer to it the contents of the memories containing the positions of the buoy and the pieces of information relating to the flight or to the voyage respectively,
remotely determining the point of impact of the aircraft or of the shipwreck, upon restoration of the drift of the buoy,
remotely analyzing the pieces of information relating to the flight or to the voyage, in order to determine the circumstances and the possible failures.

Other characteristics and advantages of the present invention will become apparent from the description made below, with reference to the appended drawings which illustrate an exemplary embodiment thereof, without any limitation, and according to which:

Figure 1:
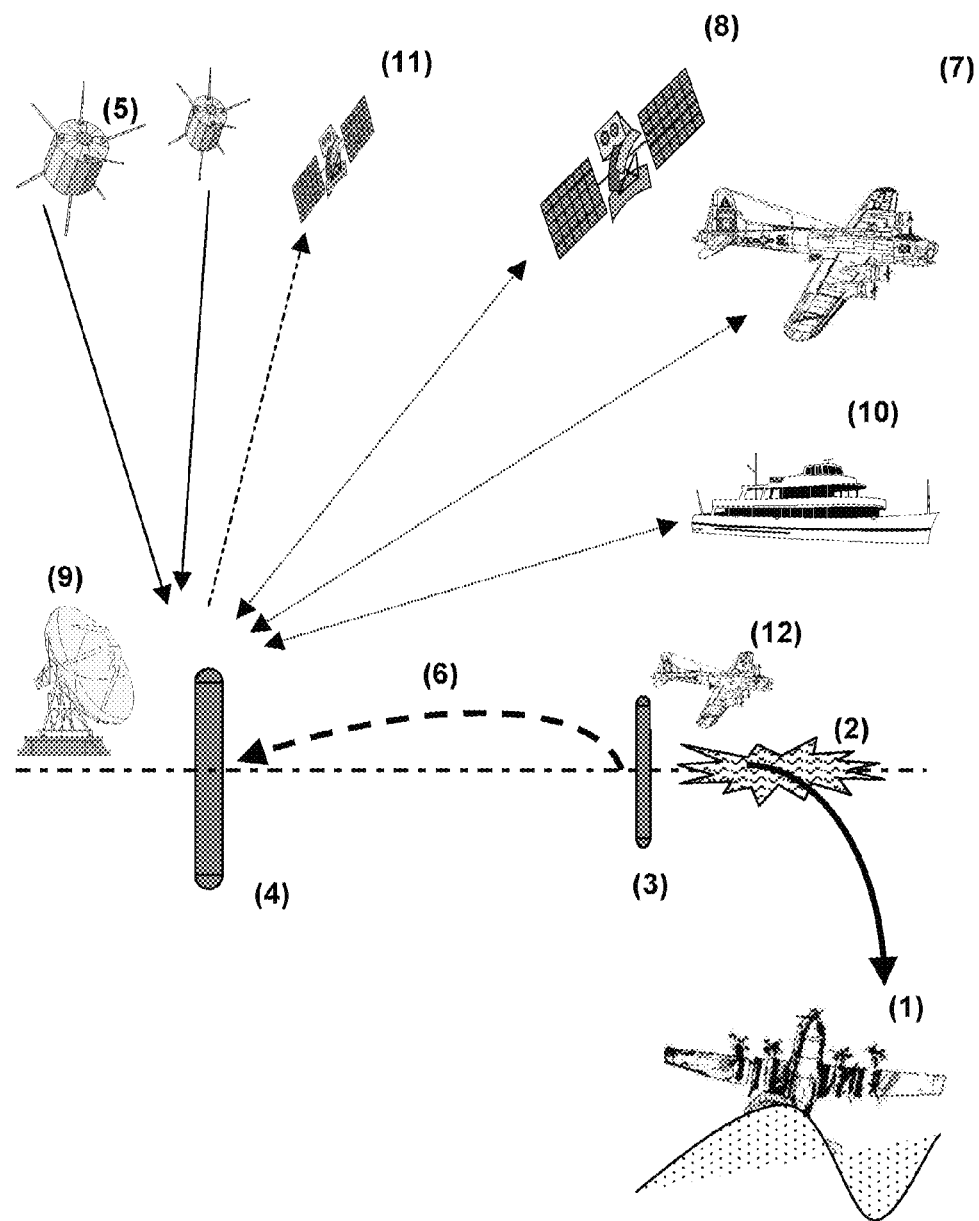
FIG. 1 is a global view of the device according to the invention.

FIG. 1 illustrates a global view of the device. An aircraft 1 is damaged on the sea floor. Close to the point of impact 2 of said aircraft with the surface of the water, is illustrated a buoy 3 drifting at the surface after its ejection from the aircraft. Its position 4 upon the radio link-up with the remote means is representative of its drift at the end of its ejection. Geolocalization satellites 5 allow the buoy to record at regular time intervals, its drift 6. Different means for remotely communicating with the buoy 4 are further illustrated, such as a sea patrol aeroplane 7, a communications satellite 8 and its control station installed on land 9 or on a ship 10. The mark 11 denotes a satellite dedicated to the localization of distress transmitters belonging to an international network such as the COSPAS-SARSAT system.

The means for remotely collecting data may also be formed by an aircraft with fixed or rotating wings, a communications satellite, a submarine, a submarine with periscope immersion.

Figure 2:
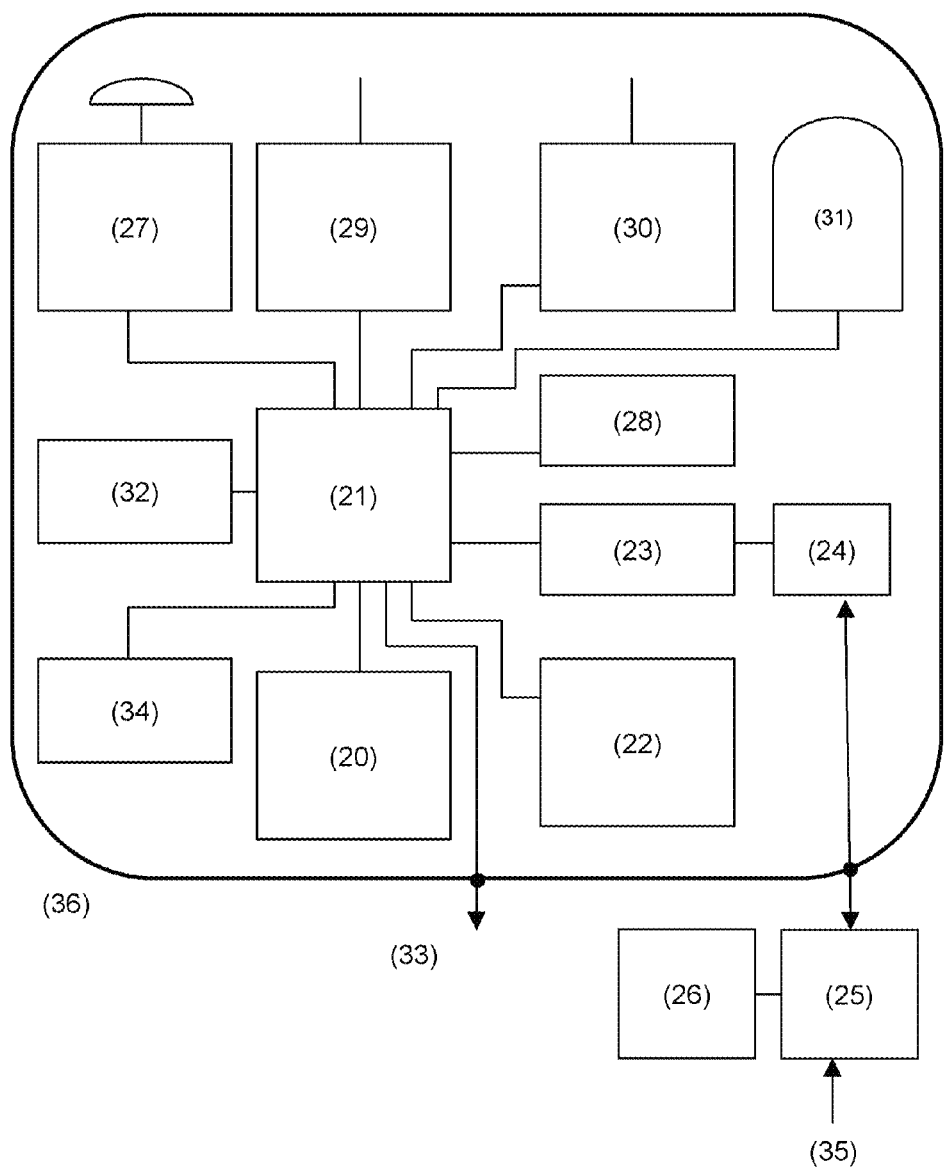
FIG. 2 illustrates a functional block diagram of the sub-assemblies of the ejectable buoy.

In FIG. 2, which illustrates a functional block diagram of the sub-assemblies of the ejectable buoy, are illustrated a source of electric power such as a battery cell, a central unit formed by a microprocessor, a device for applying voltage to the internal electronics of the buoy at the end of the ejection. This activation device 22 may be formed by electrodes detecting the contact with sea water or a contactor activated during the ejection. In a first memory 23, are recorded in a non-volatile way, pieces of information 35 characteristic of the flight or of the voyage, received via an internal interface 24 of the buoy and communication electronics 25 if necessary provided with an external device 26 for encrypting data. The data from a satellite localization receiver 27 pass through the microprocessor 21 towards a second memory 28 where the drift of the buoy since its ejection is stored, if necessary in encrypted form by using the internal circuit 32. A radio transmitter 29 is used for communicating with the remote data collecting means. Upon receiving orders, it securely transmits the contents of the memories 23 and 28. The buoy may be provided with distress transmitter 30 tuned on the international frequencies of a device for localizing distress transmitters, thereby facilitating its detection and its identification very rapidly from an earthborne center. A flashing light 31 may be activated at dusk for visually localizing the buoy with an airborne means or surface means such as a ship. Finally, under the mark 32, appears a device for encrypting information transmitted by the radio 29 in order to avoid their interception by unauthorized third parties. A test interface 33 is used to make sure in the workshop or during the flight that the electronics internal to the buoy are operating properly. The different mentioned components are integrated into an impact-resistant sealed enclosure 36 ensuring floatability by buoyancy. With a remotely controlled optional device 34, it is possible to scuttle the buoy once the contents of its memories have been remotely transferred.

Figure 3:
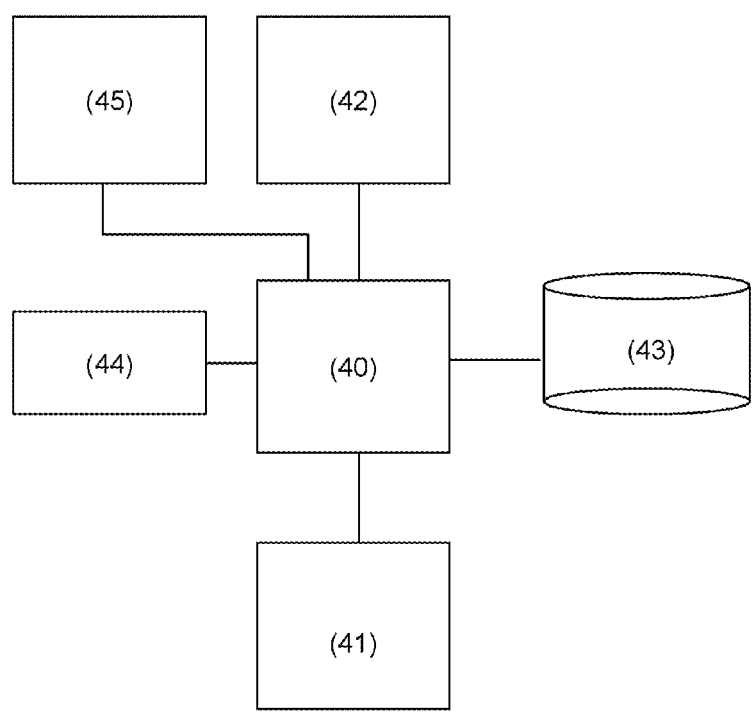
FIG. 3 illustrates a block diagram of the remote piece of equipment for collecting the data.

FIG. 3 illustrates a block diagram of the remote piece of equipment for collecting the data. It comprises a computer 40, powered by a source of electric power 41 which communicates via a radio transmitter 42 with the buoy. The communications are direct or relayed by one or several satellites 8 if necessary. The data relative to the trajectory of the buoy during its drift and relative to the flight or voyage pieces of information are, if necessary after decrypting with an encrypting device 44, transferred onto a bulk storage medium 43 either removable or not. A GPS receiver 45 may be used by the remote information collecting means when the latter is an aircraft or a ship in order to rejoin the buoy as shortly as possible.

The method of the invention is especially remarkable by the following steps:
  inserting an ejectable buoy 3 according to claim 1, into an automatic ejection device installed on-board the aircraft or the ship for which it is desired to remotely collect the recordings,
  recording in the memory 23 of the buoy, throughout the flight or the voyage, characteristic pieces of information, the values of which are desirably known later on,
  automatic ejection of the buoy in the vent of a crash or shipwreck and activation by means 22 of the electronics internal to the buoy,
  recording in a second memory 28 of the buoy, the successive positions as delivered by its satellite localization receiver 27,
  establishing a bidirectional communication with the buoy on the initiative of the remote data collecting means 40, 41, 42, 43, in order to transfer to it the contents of the memories 28, 23 containing the positions of the buoy during its drifting and the pieces of information relating to the flight or to the voyage respectively,
  remotely determining the point of impact 2 of the aircraft 12 or of the shipwreck from the restoration of the drift of the buoy,
  remotely analyzing the pieces of information relating to the flight or to the voyage, in order to determine the circumstances and possible failures.

According to another characteristic provision of the method, the collecting means is, prior to establishing a bidirectional communication with the buoy, guided in proximity to the search area from information transmitted onshore, by the aeroplane or the ship in a distress situation before its crash or shipwreck. From the foregoing discussion, the following capabilities emerge, which were not provided by the equipment according to the state of the art:
  a reconnaissance aeroplane may, in a single flight:
    a) bring back data from flight or voyage recorders,
    b) collect the pieces of information which will allow determination of the exact coordinates of the air crash or shipwreck point,
    c) continue visual reconnaissance of the floating debris.
  By using as a remote collecting means, a communications satellite such as Iridium, it is then possible to collect the data of the flight or voyage recorders and the coordinates of the drifting buoy without sending an aircraft over the crash or shipwreck area.

Significant savings on sea rescue operations result from this, the missions being of short duration and allowing collection of the data required in order to prepare future missions: knowledge of the point of impact, availability of the flight or voyage parameters which, once processed onshore, will open the route to investigations in situ with bringing back of the technical parts estimated to have failed.

Finally, as the initiative for establishing the communication is up to the remote data collecting means, increased autonomy of the buoy results from this, leaving time for mobilizing and bringing onto the area the data collecting means.

In the absence of an optional distress transmitter 30, it should be noted that the buoy does not produce any spontaneous transmissions. Consequently, it cannot be localized by an undesirable third party who, after having recovered it, would steal the contents from those to which it was intended.

Further, as the data stored in the memories 23 and 28 may be encrypted by means of the device internal to the buoy 32 or outer device 26, recovery of the buoy by a third party does not allow him/her to carry out exploitation thereof in an unauthorized way.

The invention claimed is:

1. A device for remotely collecting data from aircraft or ship recorders, comprises an ejectable buoy (3) provided with a microprocessor (21), with a bidirectional radio channel (29) with which digital data exchange may be ensured with a remote data collecting means, the buoy being provided with a satellite localization receiver (27) and with a local memory (28) in which are stored its successive positions during its drifting at the surface of the sea, said buoy further comprising a memory (23) in which are stored via a communications interface (24), prior to its ejection, pieces of information which is stored in flight recorders for aircraft, or voyage recorders for ships, said buoy also comprising a source of power (20) and a device (22) for activating its onboard electronics.

2. The device for remotely collecting data according to claim 1, wherein remotely collecting data is formed by a sea patrol aeroplane, or by an aircraft with fixed or rotating wings, or by a ship, or by a communications satellite, or by a submarine with periscope immersion.

3. The device for remotely collecting data according to claim 1, wherein ejectable buoy integrates a transmitter (30)

tuned on the international frequency of a device for localizing distress transmitters which is a SARSAT-COSPAR.

4. The device for remotely collecting data according to claim 1, wherein ejectable buoy integrates an external system for encrypting radio communications (26).

5. The device for remotely collecting data according to claim 1, wherein ejectable buoy comprises a remotely controlled scuttling device (34).

6. The device for remotely collecting data according to claim 1, wherein ejectable buoy also comprises a flashing light (31).

7. The device for remotely collecting data according to claim 1, wherein ejectable buoy integrates an internal device (32) for encrypting information transmitted by the radio transmitter (29).

8. A device for remotely collecting data from aircraft or ship recorders, comprising inserting an ejectable buoy (3) according to claim 1, into an automatic ejection device installed onboard the aircraft or the ship for which it is desired to remotely collect the recordings, recording in the memory (23) of the buoy, all along the flight or voyage, characteristic pieces of information the values of which are desirably known later on, automatic ejection of the buoy in the vent of an air crash or shipwreck and activation by the electronic means (22) internal to the buoy, recording in a second memory (28) of the buoy, the successive positions as delivered by its satellite localization receiver (27), establishing a bidirectional communication with the buoy on the initiative of the remote data collecting means (40, 41, 42, 43), in order to transfer to it the content of the memories (28, 23) containing the positions of the buoy during its drifting and the pieces of information relating to the flight or to the voyage respectively, remotely determining the point (2) of impact of the aircraft (12) or of the shipwreck, from the retrieval of the drift of the buoy, remotely analyzing the pieces of information relating to the flight or to the voyage, in order to determine the circumstances and the possible failures.

9. The device for remotely collecting data from aircraft or ship recorders according to claim 8, wherein collecting means is, prior to establishing a bidirectional communication with the buoy, guided in proximity to the search area from information which would have been transmitted onshore by the aeroplane or the ship in a distress situation before its crash or shipwreck.

\* \* \* \* \*